United States Patent Office 3,441,639
Patented Apr. 29, 1969

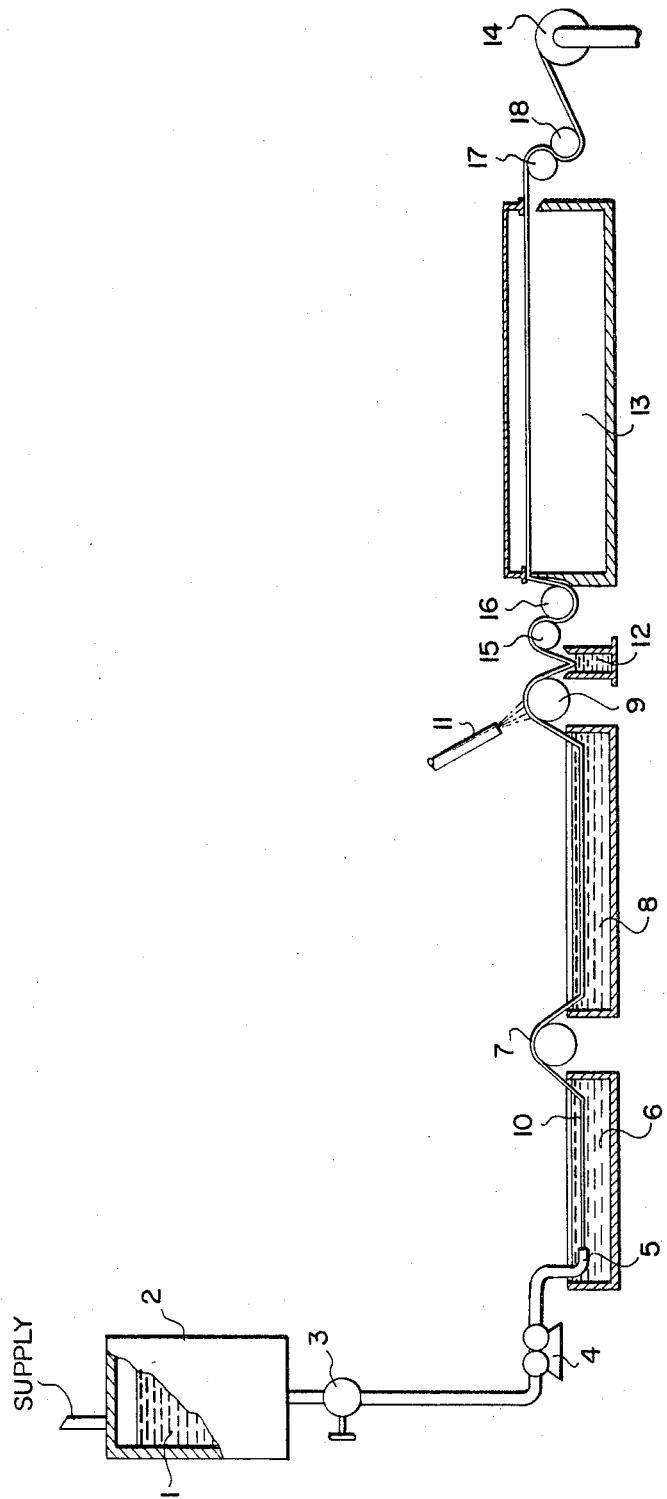

3,441,639
METHOD OF MAKING ELASTIC POLYURETHANE FILAMENTARY MATERIAL
William Robert Killen, Jr., Warwick, and Daniel Vincent Capuano, North Providence, R.I., assignors to Crown Chemical Corporation, Providence, R.I., a corporation of Rhode Island
Filed July 19, 1965, Ser. No. 473,247
Int. Cl. D01f 7/06
U.S. Cl. 264—184     12 Claims

ABSTRACT OF THE DISCLOSURE

Improved polyurethane threads are prepared by spinning a liquid prepolymer which is a reaction product of a polymer having terminal alcoholic hydroxyl groups with a diisocyanate, through a fine nozzle, or spinnerette, into a solution of a hydroxy solvent containing 15–90% of a 1,4-cyclohexane bis (methylamine). The resulting thread, consisting of a fluid core surrounded by a solid skin, is subsequently cured in a second bath consisting of the same diamine at a higher temperature. Utilization of the second bath at a higher temperature permits the diffusion of the diamine into the liquid core in order to further cure the same.

---

This invention relates to filamentary material, and more particularly, it relates to the production of a polyurethane thread or filament having improved properties.

The concept of producing polyurethane threads and the like is already well known. The prior art workers have disclosed the general procedure of forcing a liquid polyurethane prepolymer through a spinnerette into a dilute solution of a diprimary diamine which effects a rapid setting of the surface of the prepolymer to form a thread. The liquid core is subsequently set by forcing water therein under heat and pressure. The threads made by the prior art processes have the disadvantage of bad discoloration when exposed to ultra-violet radiation generally e.g., in sunlight. Also, in the prior art processes there is a need to employ hot water under pressure to penetrate the skin and to prevent the carbon dioxide formed from blistering the thread.

In yet another, newer process, namely of the type described in Cacella et al. 3,115,384, it was shown that it was not necessary to treat the core of the polyurethane thread with hot water but that the core could be solidified by curing in an air oven after suitable cleansing of the thread is accomplished. The disadvantage in this type of process results, clearly, from the fact that a plurality of steps must be employed which limits production speeds and thereby increases costs.

It is an object of the present invention to prepare an improved polyurethane thread.

It is another object of the present invention to decrease the number of steps necessary to accomplish the formation of a polyurethane thread.

It is another object of the present invention to produce a thread which can be subsequently processed at a temperature of from 500°–1000° F.

It is yet another object of the present invention to prepare a polyurethane thread having good resistance to chlorine bleaching.

It is still another object of the present invention to prepare a polyurethane thread having unusually good resistance to thermal degradation.

An additional object of the present invention is to develop a process which permits more processing variations with consequent variations in properties of the polyurethane thread formed.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the objects can be accomplished by spinning a liquid prepolymer which is a reaction product of a polymer having terminal alcoholic hydroxyl groups with a diisocyanate, preferably an aromatic diisocyanate, through a fine nozzle, or spinnerette, into a solution in a hydroxy solvent containing 15–90% of a 1,4-cyclohexane bis (methylamine). This rapidly sets the surface of the liquid prepolymer. This thread, which is actually a fluid core surrounded by solid skin, is subsequently cured in a second bath consisting of the same diamine at a higher temperature. It has been found that the utilization of a second bath at a higher temperature permits the diffusion of the diamine into the liquid core in order to further cure same.

The liquid polyurethane prepolymer employed in the invention is typically derived from a polymer of molecular weight from 300 and up and generally about 1000, preferably 1500 to 5000, having terminal alcoholic hydroxyl groups. Such polymer can be a chain extended polyester made from a glycol, preferably a mixture of ethylene and propylene glycols, and a saturated organic dicarboxylic acid, preferably adipic acid. Usually, the glycol contains 2 to 20 carbon atoms. Typical examples of such glycols include ethylene glycol, 1,4-butylene glycol, 1,6-hexanediol, propylene glycol, trimethylene glycol, 1,4-butenediol, neopentyl glycol, diethylene glycol, thiodiglycol, 2,2'-dimethy-1,3-propylene glycol, etc. The acid usually contains 4 to 20 carbon atoms. Typical examples include succinic acid, maleic acid, dihydromuconic acid, thiodipropionic acid, adipic acid, methyl adipic acid, glutaric acid, dimerized linoleic acid, sebacic acid, suberic acid, phthalic acid, and terephthalic acid. To some extent hydroxycarboxylic acids or their lactones can be used, e.g., caprolactone, to aid in forming the polyesters. As stated, mixtures of various dibasic acids and glycols can be used to form mixed esters.

An excess of the glycol over the acid is used in preparing the polyesters so that the resulting polyester contains terminal hydroxyl groups. Usually such an amount of glycol is used as to give a polyester having a hydroxyl number of 20 to 225 and preferably 36 to 75, and a low acid value, e.g., less than 6 and preferably less than 1. The molecular weight of the polyester usually ranges from 500 to 5000 and preferably 1500 to 3000. In general, the most suitable polyesters are chiefly linear with melting point levels of 90° C. or lower and preferably not over 60° C. Less suitable natural polyesters can be used, e.g., castor oil, as well as blown drying oils such as blow tung oil, linseed oil and soya oil.

Other examples of suitable polyesters for use in preparing the prepolymer are polyethylene adipate, polyethylene adipate-phthalate and polyneopentyl sebacate. Small amounts of trialcohols such as trimethylolpropane or trimethylolethane may be included in preparing the glycoldicarboxylic acid polyesters and such modified forms of polyester are included within the term polyester as used herein.

As an alternative to the polyesters there may be used for reaction with the polyisocyanate one or more elastomer yielding polyethers. Such polyethers are typically anhydrous chain extended polyethers possessing ether linkage separated by hydrocarbon chains either alkyl or aryl in nature. The ether should also contain terminal groups reactive to isocyanate, such as alcoholic hydroxyl groups. Such polyethers may be linear or branched. Usually, the polyethers are chiefly linear with a melting point of not over 90° C., preferably not over 60° C. The molecular weight may range from 500 to 5000, hydroxyl number of 225 to 22, but preferably is within the range of 750 to 3500 (hydroxyl number of 150 to 45). Preferred ethers have the formula $H(OR)_n$ where R is a lower alkylene group (2 to 6 carbon atoms) and $n$ is an integer so that the molecular weight falls within the range specified. Examples of polyethers are polyethylene glycol, polypropylene glycol, mixed polyethylene glycol-polypropylene glycol, polytetramethylene glycol (e.g., of 1000 molecular weight).

Polyethers not only can be used in place of the polyesters but can be used in conjunction therewith. Examples of such compounds are polydiethylene glycol adipate and polytriethylene glycol adipate.

The polyester or polyether (including polyetherester) is reacted or "capped" with a diisocyanate, preferably an aromatic diisocyanate, using a considerable molar excess, commonly from a 20 to a 250%, and preferably from a 50 to a 150% molar excess of the amount of diisocyanate required to react with all of the alcoholic hydroxy groups furnished by the polyester or polyether. The reaction is frequently effected by mixing the polyester or polyether with the diisocyanate either at room temperature, or at a moderately elevated temperature, e.g., 70° to 150° C., to form an uncured liquid prepolymer which is soluble in methyl ethyl ketone.

Representative of the preferred aromatic diisocyanates that may be mentioned, by way of non-limiting examples are m- and p-phenylene diisocyanate, tolylene diisocyanate (65% 2,4 and 35% 2,6), p,p'-diphenyl diisocyanate, 1,5-naphthalene diisocyanate, p,p'-diphenyl-methane diisocyanate, 3,3'-bitolylene-4,4'-diisocyanate, 2,4-tolylene diisocyanate dimer, dianisidine diisocyanate, 4-chloro-1,3-phenylene diisocyanate. Aliphatic and cycloaliphatic diisocyanates can also be used such as 1,4-tetramethylene diisocyanate, 1,6-hexamethylene diisocyanate, 1,10-decamethylene diisocyanate, 1,4-cyclohexylene diisocyanate, 4,4'-methylene-bis (cyclohexylisocyanate) and 1,5-tetrahydronaphthalene diisocyanate. Other diisocyanates can be employed. The preferred diisocyanate is tolylene diisocyanate.

The invention contemplates the conversion of the liquid polyurethane prepolymer into a fine filament or stream and thereafter converting the filament or stream into a solid thread. The first stage of the reaction is to set the outside skin of the filament or thread by way of a reaction with 1,4-cyclohexane bis (methylamine) mixed with a hydroxyl containing solvent, preferably water, the amine being from 15 to 90%, preferably 60 to 90% of the total amine and solvent. The preferred hydroxyl compound is water, although other hydroxyl bearing compounds can be used, such as ethyl alcohol, isopropyl alcohol, propylene glycol, glycerine, etc. The hydroxyl containing compounds are diluents for the amine.

The first reaction takes place at temperature of 60° to 125° F. Preferably, the bath temperature is at 120° F. It is then carried into a second bath which contains the same percentage of 1,4-cyclohexane bis (methylamine) at a temperature of from 212° to 250° F. The thread or filament after the second bath treatment has a solid core having good physical properties.

By using the 1,4-cyclohexane bis (methylamine) it is possible to diffuse the diamine into the core of the thread or filament. By setting the complete filament or thread with this unusual diamine it is possible to subject the filament or thread to a high temperature of from 500° to 1000° F. or above; at the same time it is possible to draw the filament or thread at speeds of from 500 to 1500 feet per minute.

The threads or filaments which are formed due to the second reaction bath can be processed at various speeds to obtain the size filament or thread desired. The speed at which the threads or filaments are produced will depend on the temperature at which the filaments or threads can be reoriented. Temperatures as low as 500° F. can be used if the time or orientation is about one minute and temperatures as high as 1000° F. can be used with an orientation time of three seconds.

Prior to spinning there can be added pigments in amounts of from 1% to 10%, e.g., 10% of titanium dioxide or other pigments. There can also be added antioxidants, ultraviolet absorbents, heat stabilizers, etc., prior to spinning.

Since the prepolymer is free of curing agents or catalytic or promoting materials, it has a long "shelf life" or "pot life" at temperatures as high as 150° F., i.e., it does not have to be all used up within a very short time after it is prepared. The prepolymer is essentially stable, and as long as it is preserved from contact with moisture there is little danger of the prepolymer composition setting up or hardening in the pumping system used to extrude the prepolymer into the setting bath.

In the following examples and in the above, unless otherwise indicated, all parts and percentages are based on 100 parts of the resin, or 100% of the resin, and are by weight.

EXAMPLE 1

Two commercial polyester resins of molecular weights of 3,500 and 2,000 with hydroxyl numbers averaging 40, and acid numbers of 0.9 to 2.0 (from ethylene glycol, propylene glycol) and adipic acid, with small amounts of a triol, were mixed at a temperature of 220° F. for one hour with an excess of tolylene diisocyanate in the proportion of 100 parts polyester to 18 parts diisocyanate.

A reaction occurred between the hydroxyl groups of the polyester and the diisocyanate groups to form a capped polymer intermediate characterized by the presence of unreacted isocyanate groups. This intermediate was a liquid which was soluble in the common organic solvents such as acetone and methylethylketone, etc. However, during spinning the addition of a solvent was not necessary.

Referring to FIGURE 1 of the drawing, a quantity of the liquid prepolymer mixture 1 was placed in a supply tank 2 connected through valve 3 to a pump 4 which in turn fed the spinnerette or nozzle 5 suspended just under the surface of the bath 6 containing 60 parts 1,4-cyclohexane bis (methylamine) and 40 parts ethylene glycol held at 110° F. The nozzle hole diameter was 0.03 inch. The pump setting was such that a 50 gauge thread was produced at 100 feet per minute over the first roll 7. The surface of the extruded liquid set to a solid condition immediately in the bath, the resulting thread 10 (which still had a fluid core) was conveyed over roll 7 through the bath 8 for a distance of about 8 feet at a speed of 200 feet per minute. The second bath contained the same percentage of 1,4-cyclohexane bis (methylamine) and ethylene glycol as the first, but was heated to approximately 235° F. The thread was then passed over roll 9 and through a water spray 11 into a coating bath 12 which alleviates any tackiness that the thread may have. A talc bath 12 has been found to be satisfactory. The thread was then passed over a set of pinch rolls 15 and 16 at a speed of 1,000 feet per minute, through the oven 13 at a temperature of 750° F. The thread again went through a second set of pinch rolls 17 and 18 at a speed of 1,500 feet per minute. At the take-up 14, the speed was approximately 1,400 feet per minute. The resulting thread diameter was 0.0220 inch. Its physical properties were:

Tensile strength, p.s.i. _____ 7,000
Elongation, percent _____ 500
Modulus at 300% _____ 3,800
Permanent set, percent _____ 7

The resulting thread is unique in structure in that the outer and interior core of the finished thread or filament is a polyurethane material cured essentially by chemical reaction with 1,4-cyclohexane bis (methylamine). By the use of 1,4-cyclohexane bis (methylamine) it is possible to expose the thread or filament to high temperatures for short periods of time; at the same time it is possible to stretch or draw the thread or filament. The fact that the filament or thread can be exposed to high temperatures for a short period of time can be characterized by the fact that as the thread or filament is chemically reacted, the chains are in such a position of entanglement that as they are subjected to high temperatures, they begin to relax and reorient. As the thread or filament relaxes, it is possible, at a high rate of speed, to draw the filament or thread to a much finer gauge or denier.

The thread formed in Example 1 had good resistance to heat aging, no loss in physical properties, did not discolor upon heat aging, had good resistance to chlorine bleach, and the thread had uniform weight and physical properties throughout.

EXAMPLE 2

A prepolymer was prepared as in Example 1. The resulting liquid prepolymer was then spun through a nozzle of 0.03 inch diameter, through a 60 part 1,4-cyclohexane bis (methylamine) to 40 parts water bath at 100° F. in the first bath and 215° F. in the second bath. The conditions of the spinning machine were as follows.

From FIGURE 1:

| | |
|---|---|
| First roll speed—7 ft./min | 110 |
| Second roll speed—9 ft./min | 230 |
| Pinch rolls 15, 16 ft./min | 800 |
| Oven temp. 13 ° F | 900 |
| Pinch rolls 17, 18 ft./min | 1,600 |
| Take-up 14 (approximately) ft./min | 1,500 |

The thread after take-up exhibited the following properties:

| | |
|---|---|
| Tensile strength, p.s.i. | 11,000 |
| Elongation, percent | 550 |
| Modulus at 300% | 4,000 |
| Permanent set, percent | 11 |

The resulting thread formed in Example 2 had good resistance to ultra-violet light, chlorine, ozone and heat.

EXAMPLE 3

The process of Example 2 was repeated except that 0.5 part of 1,4-butanediol was added to the diisocyanate-polyester. The properties of the thread were:

| | |
|---|---|
| Tensile | 8,000 |
| Elongation, percent | 575 |
| Modulus at 300% | 3,500 |
| Permanent set, percent | 9 |

EXAMPLE 4

A commercial polyester resin of molecular 3700, hydroxyl number of about 35, and acid number of about 0.3 (from ethylene glycol, propylene glycol) and adipic acid was mixed at a temperature of 220° F. for four hours with an excess of tolylene diisocyanate in the proportion of 100 parts of polyester to 14 parts diisocyanate. A reaction occurred between the hydroxyl group of the polyester and the diisocyanate to form a capped polymer intermediate characterized by the presence of unreacted isocyanate groups (free NCO content about 2.5%).

Again referring to FIGURE 1 of the drawing, a quantity of the liquid prepolymer mixture 1 was placed in a supply tank 2 connected through valve 3 to a pump 4 which in turn fed the nozzle 5 immersed in the first bath 6 at a temperature of 100° F. containing a 20 parts ratio of 1,4-cyclohexane bis (methylamine) and 80 parts water. The nozzle hole diameter was 0.02 inch. The pump setting was such that a 100 gauge thread was produced at 100 feet per minute over the first roll 7. The surface of the extruded liquid set to a solid condition immediately in the bath, the resulting thread 10 (which still had a liquid core) was conveyed over roll 7 through the bath 8 for a distance of about 8 feet at a speed of 200 feet per minute. The second bath contained the same percentage of 1,4-cyclohexane bis (methylamine) and water as the first, but was held at a temperature of 200° F.

The thread was then passed over roll 9 and a water spray 11 into a coating bath 12. The thread was then passed over a set of pinch rolls 15 and 16 at a speed of 500 feet per minute, through the oven 13 at a temperature of 600° F. The thread again went through a second set of pinch rolls 17 and 18 at a speed of 700 feet per minute. The resulting thread diameter was 0.0200 inch. Its physical properties were:

| | |
|---|---|
| Tensile strength, p.s.i. | 4,000 |
| Elongation, percent | 550 |
| Modulus | 1,500 |
| Permanent set, percent | 18 |

EXAMPLE 5

The same prepolymer was prepared as in Example 4, containing 2.5% free isocyanate groups.

This sample was spun under the same conditions as in Example 1. Its physical properties were:

| | |
|---|---|
| Tensile strength, p.s.i. | 9,500 |
| Elongation, percent | 625 |
| Modulus at 300% | 3,000 |
| Permanent set, percent | 11 |

The resulting physical properties could be modified considerably by variation in isocyanate content.

EXAMPLE 6

The same prepolymer was prepared as in Example 4, containing 2.5% free isocyanate groups. This sample was spun under the same conditions as in Example 1, except that the speeds of the rolls were altered as follows:

| | |
|---|---|
| Roll 7 ft./min | 150 |
| Roll 9 ft./min | 250 |
| Rolls 15, 16 ft./min | 900 |
| Oven temp. ° F | 950 |
| Rolls 17, 18 ft./min | 1,500 |
| Take-up 14 ft./min | 1,450 |

The properties of the thread obtained were as follows:

| | |
|---|---|
| Tensile strength | 9,000 |
| Elongation, percent | 600 |
| Modulus at 300% | 2,900 |
| Permanent set, percent | 12 |

EXAMPLE 7

Example 1 was repeated, except that the prepolymer was spun into a bath containing 50 parts 1,4-cyclohexane bis (methylamine), 30 parts isopropyl alcohol, and 20 parts water. Its physical properties were:

| | |
|---|---|
| Tensile strength, p.s.i. | 9,500 |
| Elongation, percent | 600–625 |
| Modulus at 300% | 2,700 |
| Permanent set, percent | 9 |

It will be apparent that many changes and modifications of the several features described herein may be made without departing from the spirit and scope of the invention. It is therefore understood that the foregoing description is by way of illustration of the invention rather than limitation of the invention.

What is claimed is:

1. A method of making an elastic thread comprising the steps of providing a liquid polyurethane prepolymer which is a reaction product of a polymer having terminal hydroxyl groups selected from the group consisting of polyesters and polyethers with an excess of a diisocyanate, extruding said prepolymer in the form of a filament into a bath of cyclohexane bis (methylamine) and of a hydroxyl containing solvent therefor to effect a setting of the thread, thereafter treating the thread to a temperature of 500° F. to 1,000 F. while tensioning the thread.

2. The method of claim 1 wherein the disocyanate is an aromatic diisocyanate.

3. The method of claim 2 wherein the hydroxyl containing solvent is water.

4. A method of making an elastic thread comprising the steps of providing a liquid polyurethane prepolymer which is a reaction product of a polymer having terminal hydroxyl groups selected from the group consisting of polyesters and polyethers with an excess of a diisocyanate, extruding said prepolymer in the form of a filament into a bath of 15 to 90% of cyclohexane bis (methylamine) and 10 to 85% of a hydroxyl containing solvent therefor to effect a setting of the thread, thereafter treating the thread to a temperature of 500° to 1,000° F. while tensioning the thread.

5. The method of claim 4 wherein the diisocyanate is an aromatic diisocyanate.

6. The method of claim 5 wherein the hydroxyl containing solvent is water.

7. A method of making an elastic thread comprising the steps of providing a liquid polyurethane prepolymer which is a reaction product of a polymer having terminal hydroxyl groups selected from the group consisting of polyesters and polyethers with an excess of a diisocyanate, extruding said prepolymer in the form of a filament into a bath of 15 to 90% of cyclohexane bis (methylamine) and 10 to 85% of a hydroxyl containing solvent therefor to effect a setting of the external surface only of the extruded material to a solid state while the interior of the filament remains fluid, then passing the filament into a second bath at a higher temperature of cyclohexane bis (methylamine) containing a hydroxyl containing solvent therefor to effect a setting of the core of the filament, thereafter treating the thread to a temperature of 500° F. to 1,000° F. while tensioning the thread.

8. The method of claim 7 wherein the diisocyanate is an aromatic diisocyanate.

9. The method of claim 8 wherein the hydroxyl containing solvent is water.

10. A method of making an elastic thread comprising the steps of providing a liquid polyurethane prepolymer which is a reaction product of a polymer having terminal hydroxyl groups selected from the group consisting of polyesters and polyethers with an excess of a diisocyanate, extruding said prepolymer in the form of a filament into a bath of 15 to 90% of cyclohexane bis (methylamine) and 10 to 85% of a hydroxyl containing solvent therefor to effect a setting of the external surface only of the extruded material to a solid state while the interior of the filament remains fluid, then passing the filament into a second bath at a higher temperature of cyclohexane bis (methylamine) containing a hydroxyl containing solvent therefor to effect a setting of the core of the filament, then tensioning the thereby formed thread, thereafter treating the thread to a temperature of 500° F. to 1,000° F. while further tensioning the thread.

11. The method of claim 10 wherein the diisocyanate is an aromatic diisocyanate.

12. The method of claim 11 wherein the hydroxyl containing solvent is water.

References Cited

UNITED STATES PATENTS

| | | | |
|---|---|---|---|
| 3,038,884 | 6/1962 | Martin et al. | 260—17.5 |
| 3,044,989 | 7/1962 | Shivers. | |
| 3,115,384 | 12/1963 | Cacella et al. | |
| 3,136,830 | 6/1964 | Oertel et al. | 264—184 |
| 3,245,956 | 4/1966 | Muller et al. | |
| 3,274,160 | 9/1966 | Ellegast et al. | |

JULIUS FROME, *Primary Examiner.*

J. H. WOO, *Assistant Examiner.*

U.S. Cl. X.R.

260—77.5; 264—210, 236, 347